(12) United States Patent
Schaeffer, III (10) Patent No.: US 9,356,995 B1
(45) Date of Patent: May 31, 2016

(54) PROXIMITY-BASED CONTENT SHARING APPLICATION

(71) Applicant: Gordon Arlan Schaeffer, III, Santa Fe, NM (US)

(72) Inventor: Gordon Arlan Schaeffer, III, Santa Fe, NM (US)

(73) Assignee: BounceChat, Inc., Sante Fe, NM (US)

( * ) Notice: Subject to any disclaimer, the term of this patent is extended or adjusted under 35 U.S.C. 154(b) by 354 days.

(21) Appl. No.: 13/844,287

(22) Filed: Mar. 15, 2013

(51) Int. Cl.
*G06F 15/16* (2006.01)
*H04L 29/08* (2006.01)

(52) U.S. Cl.
CPC ..................................... *H04L 67/10* (2013.01)

(58) Field of Classification Search
None
See application file for complete search history.

(56) References Cited

U.S. PATENT DOCUMENTS

| | | | |
|---|---|---|---|
| 2008/0109317 A1* | 5/2008 | Singh | 705/14 |
| 2010/0280904 A1* | 11/2010 | Ahuja | 705/14.58 |
| 2011/0028083 A1* | 2/2011 | Soitis | 455/3.06 |
| 2012/0315846 A1* | 12/2012 | Gartner et al. | 455/41.1 |
| 2013/0324169 A1* | 12/2013 | Kamal et al. | 455/466 |

* cited by examiner

*Primary Examiner* — Kenny Lin
(74) *Attorney, Agent, or Firm* — Jonathan D. Spangler (57) ABSTRACT

Proximity-based content sharing application between users of smart phones, tablets, and computers based on the physical proximity between the sender and receiver of the content. The sender selects a proximity range and GPS technology is used to create a virtual perimeter within which all users with the application open will be able to receive the content being shared by the sender, if they choose to accept it.

18 Claims, 10 Drawing Sheets

PROXIMITY-BASED CONTENT SHARING APPLICATION

BACKGROUND OF THE INVENTION

I. Field of the Invention

The present invention relates generally to content sharing and, more specifically, to content sharing based on the proximity between the receiver and sender of the content.

II. Discussion of the Prior Art

Social media has enjoyed explosive growth over the past several years, enabling unprecedented connectivity and content sharing among users of smart phones, computers, and tablets based on the information infrastructure possible through the advent and proliferation of the internet and wireless communication technology. A host of applications exist to facilitate the targeted sharing of content among users of such devices, with one of the more popular being the "Bump™" application developed by Bump Technologies, Inc. Bump enables users of smart devices (smart phones and tablets) to transfer content by bringing two smart devices into physical contact with one another. Bump employs an application or "app" running on the smart devices and a matching algorithm running on servers in the cloud. The app on the smart device uses sensors to detect the physical contact (known as a "bump"), and sends that sensed information up to the cloud. The matching algorithm pairs up the smart devices that sensed the same bump and then routes information between the two smart devices in that pair.

While Bump provides a unique way of sharing content with another person, it is limited insofar as it requires that the smart devices (phone or tablet) be brought into physical contact with one another, which means one person can only share that content with another person at any given time. If it's desired to share this content with several or many people, it will be increasingly time consuming and thus inefficient. Moreover, it can sometimes take several attempts to conduct a successful transfer via the Bump application, which can create further inefficiencies and time delay.

The present invention addresses the need for improved content sharing among users of smart phones, tablets and computers.

BRIEF DESCRIPTION OF THE DRAWINGS

Many advantages of the present invention will be apparent to those skilled in the art with a reading of this specification in conjunction with the attached drawings, wherein like reference numerals are applied to like elements and wherein.

DESCRIPTION OF THE PREFERRED EMBODIMENT

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure. The proximity-based content sharing application disclosed herein boasts a variety of inventive features and components that warrant patent protection, both individually and in combination.

The application of the present invention is a simple yet elegant way of sharing content between users of smart phones, tablets, and computers based on the physical proximity between the receiver (or receivers) and the sender of the content. The application accomplishes through the use of global positioning system (GPS) technology, which allows the sender to create a virtual perimeter within which all users with the application open will be able to receive the content being shared by the sender, if they choose to accept it. As will be described in detail below, the application of the present invention can be used in a number of compelling scenarios, ranging across industries, to provide a unique and improved manner of sharing content amongst interested parties.

The content is in electronic form and may include, but is not necessarily limited to, music, video, photographs, documents, messages, and URLs (Uniform Resource Locators). URLs may be used to point the receiver to the sender's content (e.g. music, video, photos, documents, etc. . . . ) on the internet and/or web or cloud-based storage, as well as to direct the receiver to a website being communicated by the sender (e.g. within the text of a message box as defined below). Depending upon the size of the content, the communications protocol (discussed below), and the distance between the sender and receiver, the sender may transfer files (e.g. music, video, photos and/or documents) located on their smart phone, tablet and/or computer without the need to transfer those files through the use of a URL.

The manner of electronic communication between the sender and receiver may be based on any number of communication technologies, techniques and/or protocols, including but not limited to web or "cloud" based wherein a URL is transmitted via wireless communication (3G, 4G, etc. . . . ) from the sender to the receiver, who may thereafter receive the content based on downloading it from the particular web-based storage location. The downloading of content based on the transmission of a URL preferably takes place automatically, based on the authorization by virtue of the receiver having already agreed to accept the "bounced" information from the sender. Electronic communication between the sender and receiver may also be "user to user" (e.g. phone to phone, phone to tablet, phone to computer, and combinations thereof) without the need to go through the web or cloud-based storage, such as through the use of WI-FI Direct, Blue Tooth, or similar technologies. The content to be transferred according to this invention may be aggregated, hosted, or a combination thereof.

Figure 1:
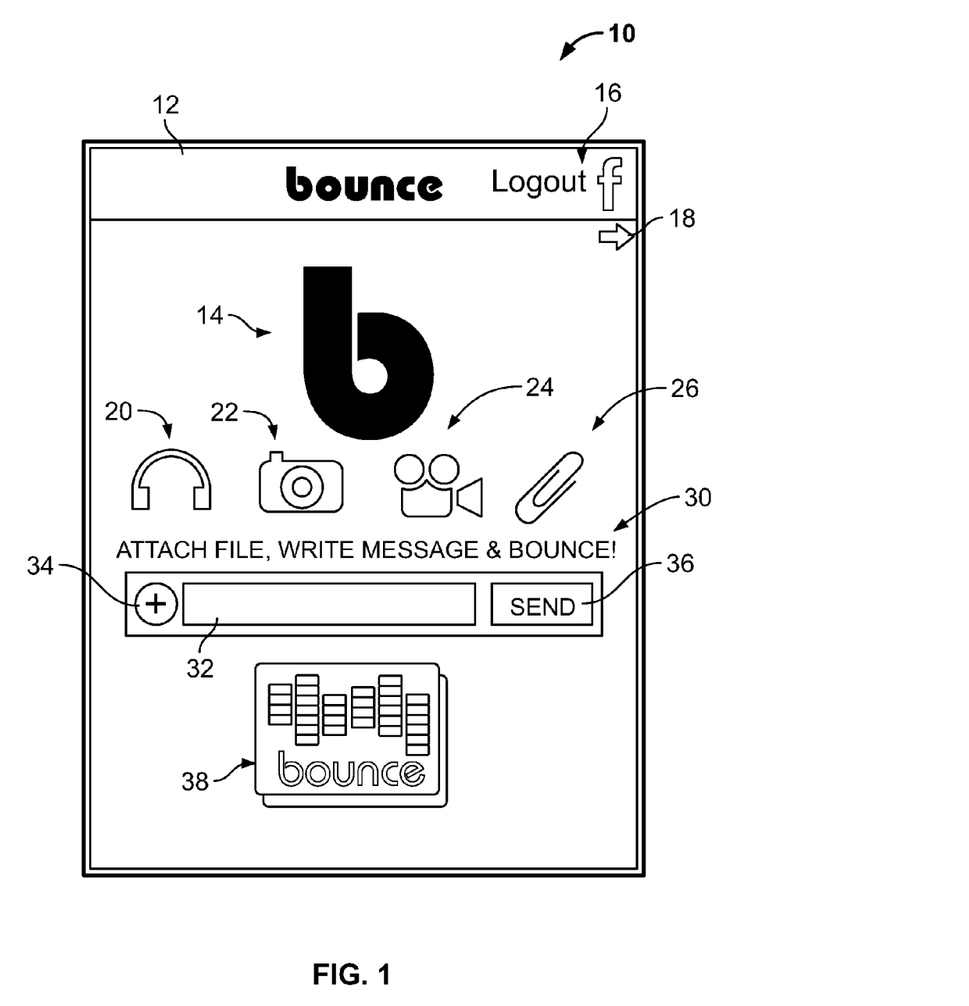
FIG. 1 is an exemplary initial GUI screen of the proximity-based content sharing application of the present invention.

FIG. 1 illustrates an exemplary initial GUI screen 10 of the proximity-based content sharing application of the present invention, named "Bounce" as denoted in the header bar 12 and represented graphically by the stylized logo comprising a lower-case "b" 14. A number of "content" icons are provided, for example a "headphone" icon 20 to denote audio content, a "camera" icon 22 to denote photographs, a "movie camera" icon 24 to denote video content, and a "paper clip" icon 26 to denote content in the form of documents. These content icons are preferably active such that, when tapped by a user, the respective folders will immediately pop up (e.g. tapping "headphone" icon 20 will open the music folder on the user's smartphone or Bounce account, tapping the "camera" icon 22 will open the photo folder on the user's computer or the user's Bounce account, etc. . . . ). In addition to these content icons, a number of "action" icons may be provided, such as a "+ sign" icon 34, a "Send" icon 36, and a "Bounce" icon 38, the functionality of which will be described below. A "message" field 32 is provided should the sender wish to type in content to be transmitted to the receiver (e.g. a message such as "I hope you like it!" and/or a URL to direct the receiver to the sender's website, for example). An instruction line 30 is provided to instruct the user on the basics of using the proximity-based content sharing application of the present invention, which according to one aspect is set forth as: "Attach File, Write Message & Bounce!" A login/logout icon 16 is provided to allow a user to login, logout and/or become a member of the "Bounce" system/community. An arrow icon 18 is provided to allow a user to easily progress to the next page within the application (to be described below) by pressing the arrow icon 18 or swiping screen to the left.

The "+ sign" icon 34 is used by a sender to initiate the process of attaching and/or selecting content to be transferred to one or more receivers. The selected content may be transferred from sender to receiver by pressing the "Send" icon 36 or the "Bounce" icon 38. Pressing the "Send" icon 36 will transfer the selected content via traditional communication means such as SMS/Text, email, etc. . . . to one or more pre-selected receivers irrespective of their geographic location relative to the sender. Pressing the "Bounce" icon 38 will transfer the selected content to only those receivers physically located within a preselected proximity relative to the sender, as set by the sender before initiating the proposed transfer, should each such receiver choose to accept the selected content from the sender. The sender may set the predetermined proximity range by selecting it from a list of predefined proximity ranges (e.g. ranges of FIG. 2) or may be defined by said user to form a customized proximity range (not shown).

This "bounce" functionality forms a primary aspect of the present invention, although the invention extends to its combination with the traditional "send" functionality and/or any number of additional features described herein. For example, it is optional for the sender to include a message in the "message" field 32 along with the selected content to be transferred via either the "bounce" functionality and/or "send" functionality. Indeed, due to the optional nature of including a message, the proximity-based content sharing application of the present invention is capable of transferring content without requiring the sender or the receiver to type in any alphanumeric characters in order to effectuate the transfer (such as with traditional email or text communications, for example). Instead, the sender need only tap the "+ sign" icon 34, tap a file or file name in order to select the content to be transferred (e.g. from a list of files or folders presented after tapping the "+ sign" icon 34), and hit the "Bounce" icon 38. The receiver may then simply tap the "Accept" notification initiated by the sender hitting the "Bounce" icon 38 in order to receive the selected content. The same is true for the "send" functionality, in that the sender need not type in any alphanumeric characters in order to effectuate the transfer of selected content. Instead, the sender need only tap the "+ sign" icon 34, tap a file or file name in order to select the content to be transferred (e.g. from a ilist of files or folders presented after tapping the "+ sign" icon 34), and hit the "Send" icon 34 in order to send the selected content to the pre-determined receivers.

Given the advent of "SIRI" and similar voice-recognition software, t is also contemplated that the sender may simply speak the actions and/or instructions to effectuate the transfer of selected content according to the present invention. For example, after the sender activates the voice-recognition functionality (e.g. pushing the "SIRI" button on an iPhone), the sender may speak the desired actions and/or instructions, for example "attach the song 'Revolution' and bounce" or "bounce the song 'Revolution'", which would invoke the steps associated with the "bounce" functionality. In similar fashion, the sender may invoke the "send" functionality by speaking the desired actions and/or instructions such as "attach the song 'Revolution' and send to Trent Stoner" or "send the song 'Revolution' to Trent Stoner."

Audio files may include, but are not necessarily limited to, music/songs, podcasts, audiobooks, iTunes, etc. . . . and may be in any of a variety of data formats including but not limited to MP3. Photo files may be in any of a variety of data formats including but limited to JPEG, TIFF, and PNG. In one aspect, thumbnail images of selected photos (pre-existing and/or recently taken and resident on the user's phone, tablet or computer) may be sent to other users along with or within an optional text message as will be described below. Video files may be in any of a variety of data formats including but not limited to MP4 and Quicktime. In one aspect, URL and associated thumbnails of selected videos (pre-existing or recently taken and resident on the user's phone, tablet or computer) may be sent to other users along with or within an optional message as described herein. Video files as used herein may include not only pre-recorded videos, but also high definition live streaming video such as may be available via rtmp/rtsp/rtp,udp protocols, real time transcoders, encoders, decoders to ensure proper formats on all devices, and multi-threaded software that delivers up to 10 Gbps of per-server video streaming performance for on-demand and live streaming on standard hardware to deliver Live H.264 everywhere. Document files may be in any of a variety of data formats or programs, including but not limited to Word, PDF, PDF, Notes, Excel, and Power Point. In one aspect, various newly created documents (e.g. Notes) may be sent to other users along with or within an optional text message as described herein.

As noted above, the message box 32 allows the sender to type in alphanumeric characters to accompany the transfer of the selected content, whether using the "bounce" or proximity-based communication functionality or the "send" or traditional communication functionality. As noted above, the alphanumeric characters may be used to form a typed message to the receiver and/or to form any of a variety of links or URLs, including but not limited to Facebook, Twitter, Bandpage, Soundcloud, Tumblr, Picaso, Flicker and any other social networking sites. In the case of links or URLs transferred by the sender, this content will result in a mirror image on the receiver's smart device, tablet and/or computer.

With a file attached or identified and any optional message and/or link or URL typed into the message box 32, the sender may then hit the "Bounce" icon 38 to initiate the transfer of that selected content using the "bounce" functionality. The first step involves sending a notification request to all potential receivers, which informs them that a "Bounce" request has been initiated by the sender (preferably listing the sender's identity), and asking them whether they would like to accept or decline the proposed transfer of content. Within the context of the "bounce" functionality, "potential receivers" means all individuals physically located within a pre-selected proximity relative to the sender, as defined by the sender, with the proximity-based content sharing application of the present invention activated (i.e. turned on and capable of receiving communications from the sender). If a potential receiver accepts, then the selected content will be transferred to their "Bounce" application such that it can be consumed by the receiver (e.g. viewed in the case of photo and video files, listened to in the case of audio files, read in the case of documents and any optional message, etc. . . . ). If the potential receiver declines, the proposed transfer will not occur to that particular user.

Based on pre-selected proximity settings established by the user (described below), and the simplicity of the system, the "Bounce" application of the present invention enables the fast and efficient transfer of selected content to any users with the "Bounce" application who are physically located within the pre-selected geographic range relative to the sender, provided they choose to accept the selected content from the sender when prompted prior to actual the transfer. The sending of content according to the "bounce" functionality is not based on pre-existing associations, friendships, or affiliations between the sender and receiver, but rather geographic proximity. The broad-ranging applicability and versatility of the proximity-based content sharing application of the present invention will be evident from the various examples described below.

Figure 2:
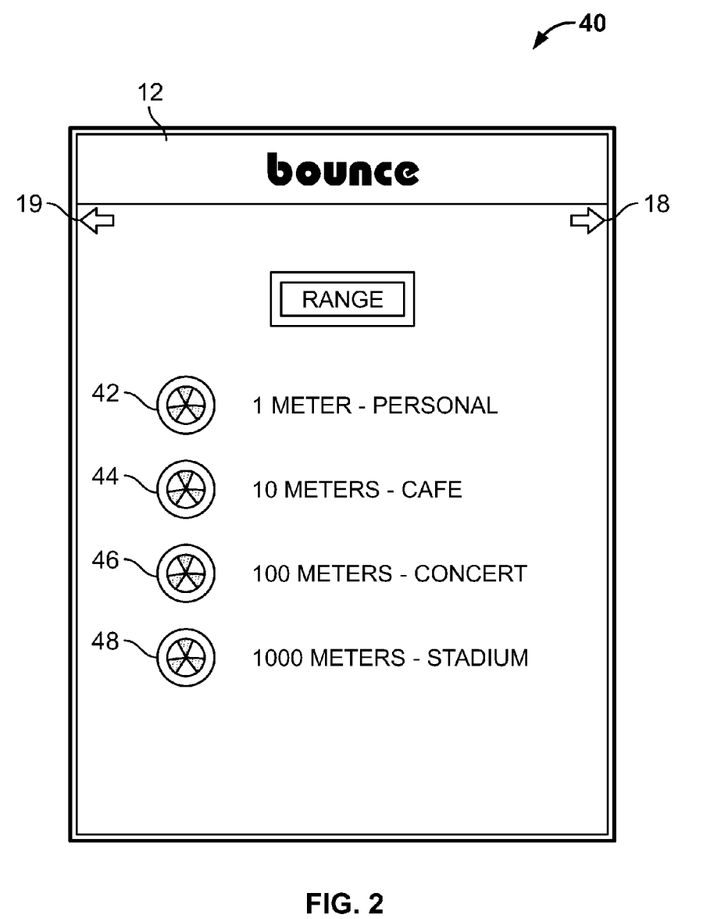
FIG. 2 is an exemplary GUI screen of the proximity-based content sharing application of the present invention which enables the user to set various proximity settings.

FIG. 2 illustrates an exemplary GUI screen 40 of the proximity-based content sharing application of the present invention, which enables the user to set various proximity settings, referred to as "bounce ranges" in FIG. 2. These proximity settings define the distance between the sender and a potential receiver. The proximity ranges (aka "bounce ranges") set forth in FIG. 2 are defined (for illustrative purposes) within the context of a musician user of the proximity-based content sharing application, with ranges of "1 Meter—Personal", "10 Meters—Café", "100 Meters—Concert" and "1000 Meters—Stadium" as will be described below. It will of course be appreciated that the "bounce ranges" may vary depending upon the user, their profession, interests, the particular type of content to be shared, etc. . . . For example, a real estate developer or agent may define ranges of "Showing" (e.g. 10 meters), "Neighborhood" (e.g. 1000 meters), "Town" (e.g. 10,000 meters), and "Region" (e.g. 100,000 meters) to help determine the geographic scope of their usage of the proximity-based content sharing application of the present invention. In one aspect, the application may have a variety of predefined professions or categories from which the user may select as part of the settings, each of which has a predetermined number of bounce ranges particular to that profession or category. In another aspect, the user may define or customize their own bounce ranges or modify any predefined bounce ranges from the list of predefined professions or categories.

Referring to FIG. 2 and the musician-user context, there are by way of example only four predefined proximity settings, namely: "1 Meter—Personal", "10 Meters—Café", "100 Meters—Concert" and "1000 Meters—Stadium". The proximity ranges are selected by each user of the application to dictate the geographic range of any transfer of content prior to being initiated or sent. To select one of these proximity ranges, the user need only tap the associated "bounce range" icons 42, 44, 46, 48. Once selected, the user may progress to the next page (described below) by hitting the right arrow 18 or swiping his or her finger to towards the left. The user may alternatively progress to the previous page (e.g. FIG. 1) by hitting the left arrow 19 or swiping his or her finger towards the right.

The "1 Meter" range is referred to as "Personal" because the transfer of selected content will only take place with potential receivers located within one (1) meter of the sender, which most would consider to be in close or "personal" proximity. The "10 Meters" range is referred to as "Café" because the transfer of selected content would only take place with potential receivers within ten (10) meters of the sender, which is the approximate size of a typical café. The "100 Meters" range is referred to as "Concert" because the transfer of selected content would only take place with potential receivers within one hundred (100) meters of the sender, which is the approximate size of a typical concert hall venue. The "1000 Meters" range is referred to as "Stadium" because the transfer of selected content would only take place with potential receivers within one thousand (1000) meters of the sender, which is the approximate size of a typical stadium venue. These qualifiers (e.g. personal, café, concert, stadium) are intended to intuitively conjure up specific notions of proximity on the part of the user.

Figure 3:
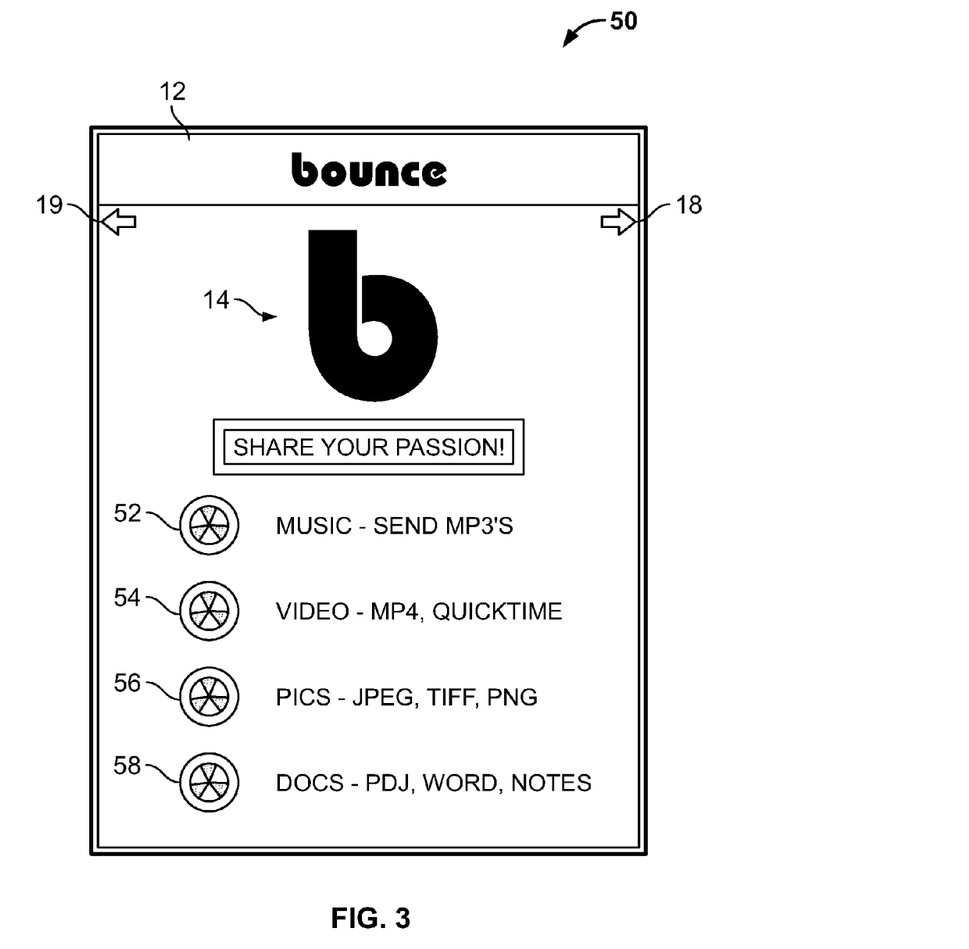
FIG. 3 is an exemplary GUI screen of the proximity-based content sharing application of the present invention which allows a user to select the type of content they wish to share (e.g. Music, Video, Pictures, Documents)

FIG. 3 is an exemplary GUI screen 50 of the proximity-based content sharing application of the present invention, which allows a user to select the type of content they wish to share (e.g. Music, Video, Pictures, Documents). While this accomplishes the same goal as the GUI 10 described in FIG. 1, namely selecting content to be shared, GUI 50 does so with a different layout, with a "Music" button 52, "Video" button 54, "Pies" button 56, and "Docs" button 58. The Music button 52 allows the user to select music files such as (but not necessarily limited to) those uploaded to the user's account including but not limited to those in MP3 audio file format. The Video button 54 allows the user to select video files such as (but not necessarily limited to) those uploaded to the user's account including but not limited to those in MP4 and Quicktime video file formats. The Pics button 56 allows the user to select digital photograph files such as (but not necessarily limited to) those uploaded to the user's account, including but not limited to those in JPEG, TIFF, and PNG file formats. The Docs button 58 allows the user to select electronic document files such as (but not necessarily limited to) those uploaded to the user's account, including but not limited to Word, PDF, PDF, Notes, Excel, and Power Point document types.

With the content selected through the use of buttons 52-58, the sender may then initiate a "bounce" transfer of that selected content (such as by tapping a "Bounce" button akin to the Bounce icon 38 shown at in FIG. 1). As described above, the first step involves sending a notification request to all potential receivers, which informs them that a "Bounce" request has been initiated by the sender (preferably listing the sender's identity), and asking them whether they would like to accept or decline the proposed transfer of content. If the potential receiver accepts, then the selected content will be transferred to their "Bounce" application such that it can be consumed by the receiver, namely viewed in the case of photo and video files, listened to in the case of audio files, or read in the case of documents and any optional message (if provided akin to message box 32 in FIG. 1). If the potential receiver declines, the proposed transfer will not occur to that particular user.

Figure 4:
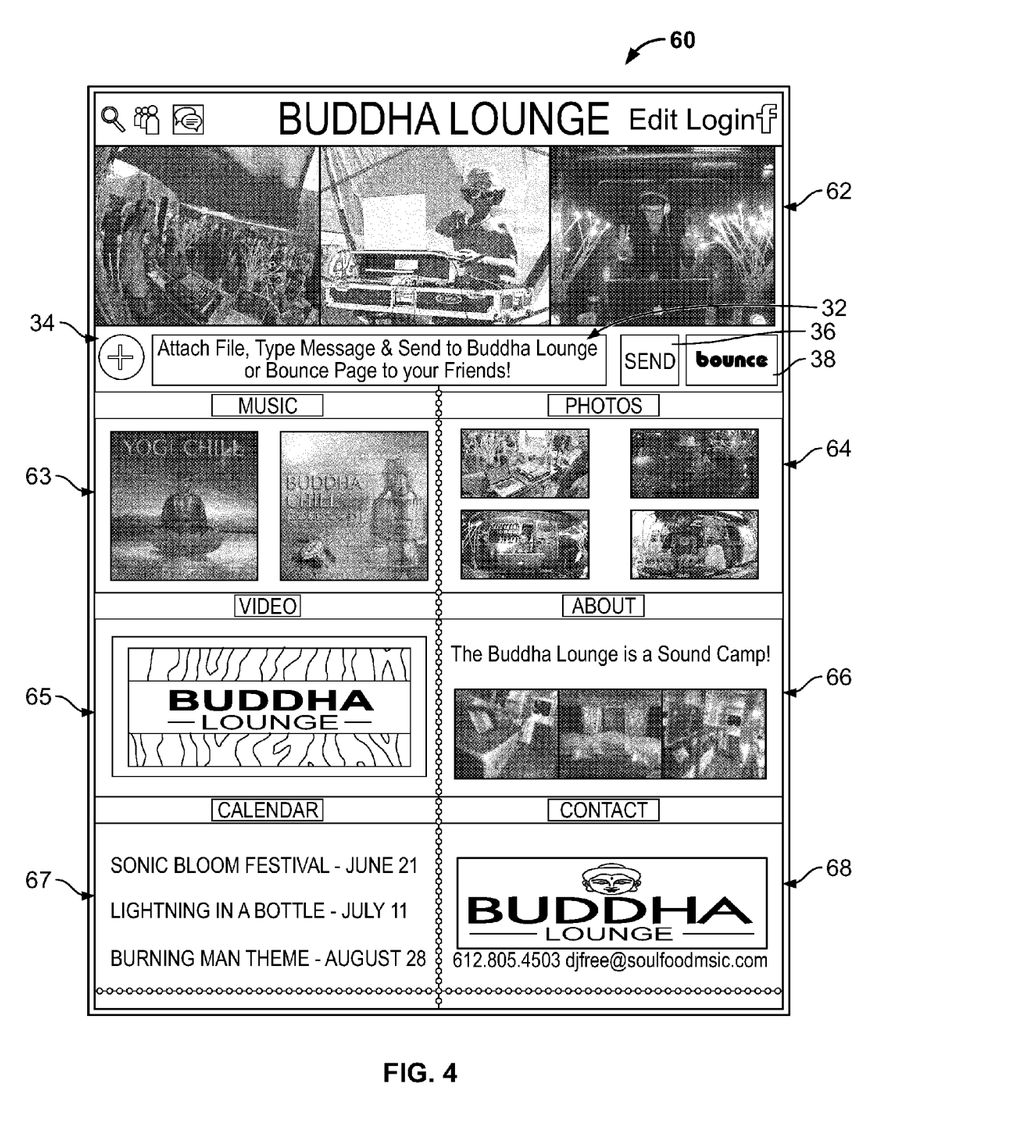
FIG. 4 is an exemplary GUI screen of the proximity-based content sharing application of the present invention which allows users to post any of a variety of content on a customized profile page for sharing with others.

FIG. 4 is an exemplary GUI screen 60 of the proximity-based content sharing application of the present invention, which allows users to post any of a variety of content on a customized profile page for sharing with others. In the embodiment shown, there are by way of example seven (7) separate media panes for customized content-building on the part of the user, namely a main media pane 62, a "Music" pane 63, a "Photos" pane 64, a "Videos" pane 65, an "About" pane 66, a "Calendar" pane 67 and a "Contact" pane 68. To explain within the context of a musician user of the "Bounce" application, the main media pane 62 may include any number of photos and/or text (e.g. "Buddha Lounge") to identify the user and capture the attention of the viewer. The Music pane 63 may include information about or artwork from any albums or singles or demos created by the user, including links for any viewer to listen to some or even all of those works. The Photos pane 64 and Videos pane 65 may include photos and videos, respectively, of the musician, his band, images from past performances, the fans, post-show parties, etc. . . . The About pane 66 may provide background information on the musician, such as influences, instruments played (e.g. guitar, piccolo, etc. . . . ), areas played or past tours, training or education, etc. . . . The Calendar pane 67 may set forth upcoming tour and/or event information about where the musician will be playing and/or events he's scheduled to attend. The Contact pane 68 may include the contact information of the musician and/or their booking agent, such as physical address, email address, phone number, fax number, etc. . . .

The profile page 60 may also include the message box 32, the "+" sign 34, the "Send" icon 36, and "Bounce" icon 38 previously described with reference to FIG. 1. However, in this embodiment, these features 32, 34 and 36 may be used to send some or all of the content set forth on the profile page 60 (as well as an optional message via box 32) to potential receivers via the "bounce" functionality. To do so, the musician user would hit the "+" sign 34, select the desired content (e.g. individual panes such as Music pane 63 and Contact pane 68, or the entire media page 60 with all media panes 62-68, etc. . . . ), and hit the "Bounce" button 38. This initiates the transfer of that selected content, which first involves sending a notification request to all potential receivers informing them that a "Bounce" request has been initiated by the sender (preferably listing the sender's identity), and asking them whether they would like to accept or decline the proposed transfer of content. If the potential receiver accepts, then the selected content will be transferred to their "Bounce" application such that it can be consumed by the receiver, including the option of downloading any media contained on the profile page 60 (e.g. songs, videos, etc. . . . ). If the potential receiver declines, the proposed transfer will not occur to that particular user.

The power and versatility of the proximity-based content sharing application of the present invention will now be described within several contexts, the first of which is a continuation of the musician user example above. One of the biggest challenges for musicians is not only introducing people to their music, but ensuring that those introduced spend sufficient time listening to it to gain a true appreciation and want more and help proliferate their interest to others. In today's hi-tech environment it can be challenging for artists to connect with their fans and share original music and multimedia. Press packs are lost, web-links broken and social networks complicated. Musicians don't know "if" or "when" recipients of such material will listen to their music, watch their video or read their tour information, updates, etc. . . . Moreover, timing is oftentimes of the essence to capitalize on introductions with key or interested people (e.g. producers, promoters, DJs, prominent musicians, etc. . . . ). When that moment to exchange music or media ceases the chance rarely reappears.

The proximity-based content sharing application of the present invention addresses these challenges by allowing a musician user to create a profile page 60 containing all the content (and more) of a traditional press pack. Rather than rely upon physically handing such material off to someone (which the musician is unlikely to have on them at all times and thus will invariably miss opportunities), the profile page 60 can be quickly and efficiently transferred to the target as follows: The musician opens the application on their smart phone, tablet or computer, selects the desired content with the "+" sign 34 and hits the "Bounce" button 38. The target opens the application on their smart phone, tablet or computer and hits "Accept" when the notification arrives from the musician sender. In this scenario, the musician may want to ensure the proximity setting is to "1 Meter—Personal" unless there are others in the vicinity who may be interested, which may warrant the "10 Meters—Café" setting. If need be, the musician can quickly navigate to the "Select Bounce Range" page (FIG. 2) through the use of the arrows 18, 19 or swiping the screens left or right as necessary, make the necessary changes to the proximity settings, and quickly navigate back to the profile page 60 to send the selected content to the target.

The proximity-based content sharing application of the present invention also may also help the musician distribute music directly to fans during a performance, for example to capitalize on the excitement and energy and interest at that moment. To do so, the musician may simply tell the crowd, for example immediately after a song has been performed, that he or she is going to "bounce" the song to everyone as a token of appreciation or something to that effect. The musician simply selects the song and hits "Bounce" per discussion of FIGS. 1 and 3, with a proximity range sufficient to encompass the entire crowd based on the venue (e.g. small venue=10 Meters—Café, moderate venue=100 Meters—Concert, large venue=1000 Meters—Stadium). Everyone in the crowd with an open "Bounce" application would simply hit "Accept" when the notification arrived, and thus have near instantaneous receipt of the song while still at the event. This would increase the "stickiness" of the music, as the concert goers are far more likely to listen to adopt that music if it's reinforced so close in time to the live event.

Filmmakers and those in the movie industry would find the proximity-based content sharing application of the present invention equally helpful and advantageous. Those individuals (especially those just starting out) experience challenges similar to musicians in terms of capitalizing on chance encounters and having the target actually read the script, view the trailer, keep their card, etc. . . . With the proximity-based content sharing application of the present invention, they would simply open the application on their smart phone, tablet or computer, select the desired content with the "+" sign 34 and hit the "Bounce" button 38. The target would then open the application on their smart phone, tablet or computer and "Accept" the request when the notification arrives from the filmmaker sender. It could also be useful in distributing media kits, trailers, etc. . . . immediately following a premier or showing. For example, the filmmaker could simply select and transfer content about the movie (e.g. special features, behind the scenes, trailers, etc. . . . ) to the audience while in the theatre (with "100 Meters—Concert" proximity setting), which again may drive follow-up interest or proliferation of the film.

Businesses and professionals may also find the proximity-based content sharing application of the present invention of benefit for a variety of reasons. Businesses could create a profile page 60 specific to their products or services, listing prices, special offers, deals, rebates or the like, sending Twitter updates, radio spots, HD photos, commercials, websites, Twitter updates and a Linked-In or Facebook connection instantly to clients or potential customers. The businesses could send notifications to any users passing by who have their "Bounce" application open. Those notifications could be sent automatically (such as if users are detected to be nearby) or periodically based on a set time duration (e.g. once every 30 minutes). If users have their "Bounce" application open while in the vicinity of the business, they will receive a notification from the business asking whether they want to receive content from that business. If they accept, they will receive that information and may be interested enough to enter the business and make a purchase.

If the users don't want to get such notifications from businesses, or to get them on a repeated basis, they could go to a "Settings" page and turn off the receipt of notifications from all businesses, certain businesses, or any business but only after declining the initial notification from a particular business. Such businesses could include, but are not necessarily limited to, restaurants (sharing new menus, specials, etc. . . . ), department stores (sharing prices, sales, etc. . . . ), banks (sharing refinance terms, interest rates, etc. . . . ), gas stations (sharing prices, oil change specials, etc. . . . ), etc. . . .

Professionals may also find the proximity-based content sharing application of the present invention helpful in its ability to serve as an electronic business card. This, as opposed to exchanging physical business cards, which can be cumbersome not only due to the propensity to lose them, but also due to the manual nature of transferring the contact information into an electronic contacts database (e.g. Outlook) which is where most people keep their contacts these days. The people exchanging contact information could simply send their own custom profile page 60, as described above. In the professional scenario, the profile page 60 could contain a host of information and content well beyond the traditional business card, for example a digital resume, career highlights, videos of strong presentations, profile photos, etc. . . .

Professionals may also find the proximity-based content sharing application of the present invention helpful in terms of communicating materials to attendees at meetings (e.g. Power Point presentations, spreadsheets, etc. . . . ), conferences, trade shows, etc. . . . For example, a speaker at a meeting may want to distribute the slides or other material to the attendees before and/or after the presentation. Especially if the speaker is at a meeting he or she doesn't know everyone in the audience (that is, doesn't have their email addresses), the proximity-based content sharing application of the present invention could be quickly and easily employed to distribute that information. The speaker would need only select the presentation materials and hit "Bounce", with a proximity range sufficient to encompass the venue of the meeting. Attendees with the "Bounce" application open on their smart phone, tablet or computer could simply accept the notification and receive the selected content.

Teachers and school administrators may find the proximity-based content sharing application of the present invention of benefit. In this context, it could be extremely helpful in distributing coursework (e-books, etc. . . . ), homework assignments, cafeteria menu, calendar information, school-wide announcements, etc. . . . Such content sharing may be between teachers and their school children (e.g. homework, etc. . . . ), amongst teachers (e.g. exchanging lesson plans, etc. . . . ) and between school administrators and parents (e.g. report cards or discipline reports when in the "1 Meter—Personal" proximity range at parent-teacher conferences, etc. . . . ). This could be of benefit at virtually every level of education, from grade school onward through higher education, especially given the trend towards the use of computers, tablets, etc. . . .

The proximity-based content sharing application of the present invention also holds great promise in sharing content via social media. For example, the "Bounce" application could be employed with Bandpage and allow its musicians to instantly "Bounce" their electronic press kit from their iPhone to the Droid smart phone of a concert booking agent while networking at an event. It could also be used with Soundcloud to provide its users the ability to share their new remix to a publicist they meet at a club in real time. Linked-in users could organize their content and "Bounce" a unique multi-media presentation that offers a deeper understanding of what that person has to offer. This may be accomplished by transferring the social media URL of the sender to a receiver as part of a customized profile page 60 and/or via inclusion in a message transmitted to the receiver via the message box 32.

As described above, in addition to the "bounce" functionality, the present invention may optionally include the traditional "send" functionality, namely the transfer of selected content to predefined receivers through SMS/Text communications, email communications, etc. . . . In either case, the content to be transferred may include URL or links selected by the sender, including but not limited to the sender's Facebook and/or Twitter account. All comments on such Facebook and/or Twitter accounts can be placed on the user's profile page 60 and conversely, all comments on the proximity-based content sharing application of the present invention can be placed on the user's profile on Facebook and/or Twitter. Users of the proximity-based content sharing application of the present invention may also create their own network on their profile page 60 based on "drag and drop" modules which allow the users to place their social media components in one or more of the media panes 63-68.

Figure 5:
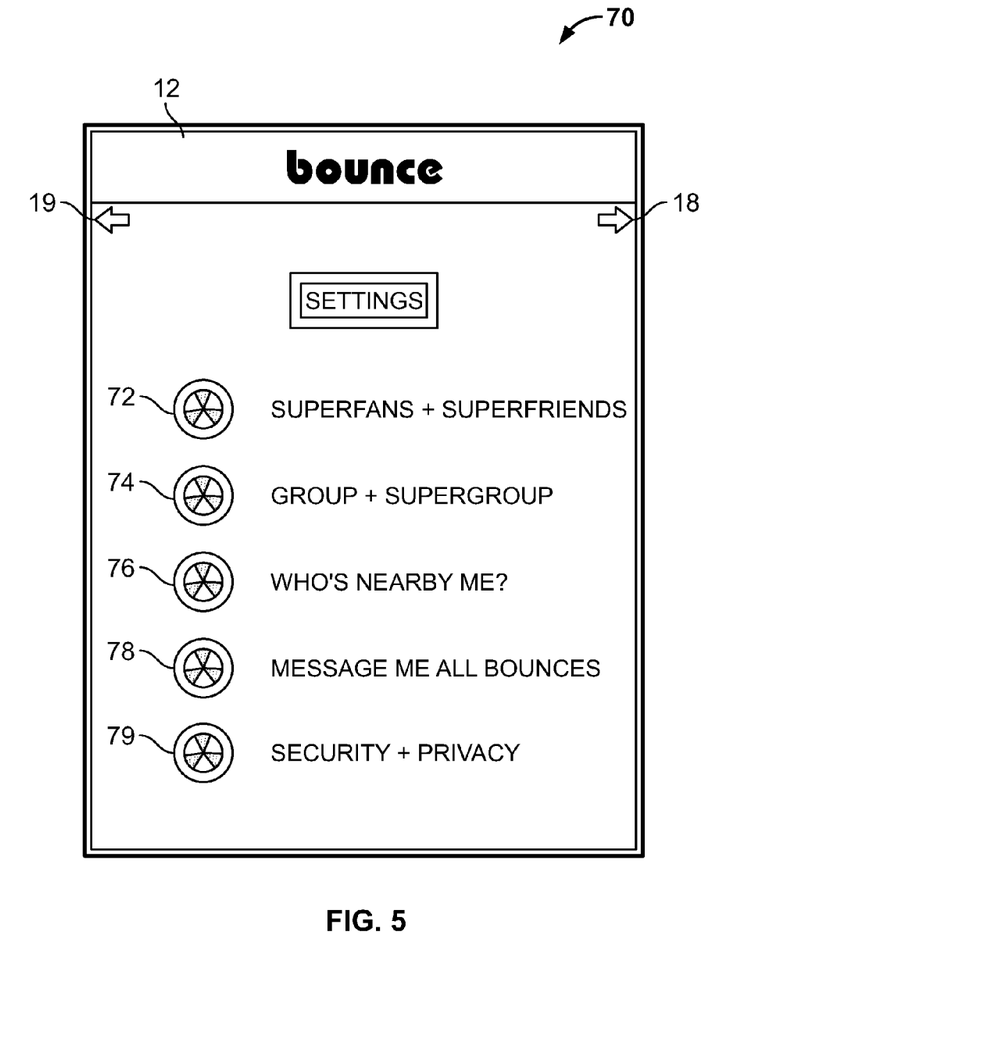
FIG. 5 is an exemplary GUI screen of the proximity-based content sharing application of the present invention which allows users to select any of a variety of system settings.

FIG. 5 illustrates an exemplary GUI screen 70 of the proximity-based content sharing application of the present invention which allows users to select any of a variety of settings. The settings include, by way of example only, a "Superfans+Superfriends" button 72, a "Group+Supergroup" button 74, a "Who's Nearby Me?" button 76, a "Message Me All Bounces" button 78, and a "Security & Privacy" button 79. The "Superfans+Superfriends" as well the "Group+Supergroup" settings are designed to allow a sender to transfer selected content to a predetermined list of receivers using the "bounce" functionality, although in this instance irrespective of the geographic location of the receivers. The terms may be selected depending on any number of factors, such as a common interest in a particular band (e.g. Fan or Superfan), membership in an organization (e.g. Group or Supergroup), or belonging to a group of friends (e.g. Friends or Superfriends). The distinction between Fan and Superfan, Group and Supergroup, or Friends and Superfriends may be to distinguish between a larger set of individuals belonging to a predefined list of receivers, and a smaller subset who may enjoy a distinguishing trait or characteristic. For example, while a number of individuals may form a list of Friends, Fans or Group, they may qualify as Superfriends, Superfans or members of a Supergroup by, for example, being within a predetermined geographic proximity to the sender, such as may occur if members of a list of Fans of a particular musician happen to be attending a concert of the sender-musician and hence within one of the "bounce ranges" of the sender.

The "Who's Nearby Me?" setting is designed to inform a user as to the presence of other users within the predetermined proximity range. The proximity-based content transfer application of the present invention may list the names of any such users within the predetermined proximity range, or they may be shown anonymous. Users may be able to select in the Settings whether or not their name will be displayed or whether it will show their presence in an anonymous manner.

The "Message Me All Bounces" setting is designed to provide the sender with copies or a history of all transfers of content using the "bounce" functionality of the proximity-based content sharing application of the present invention. The "Security & Privacy" button 79 is designed to allow the user to set and/or modify the various security and privacy settings, much in the same manner as other applications (e.g. Facebook, Twitter, LinkedIn, etc. . . . ). Although not listed on the Settings page 70, it will be appreciated that any reference herein to settings or the modification of settings (e.g. selecting the type of business to help select the "bounce ranges" as describe above) may be included on this Settings page 70.

Figure 6:
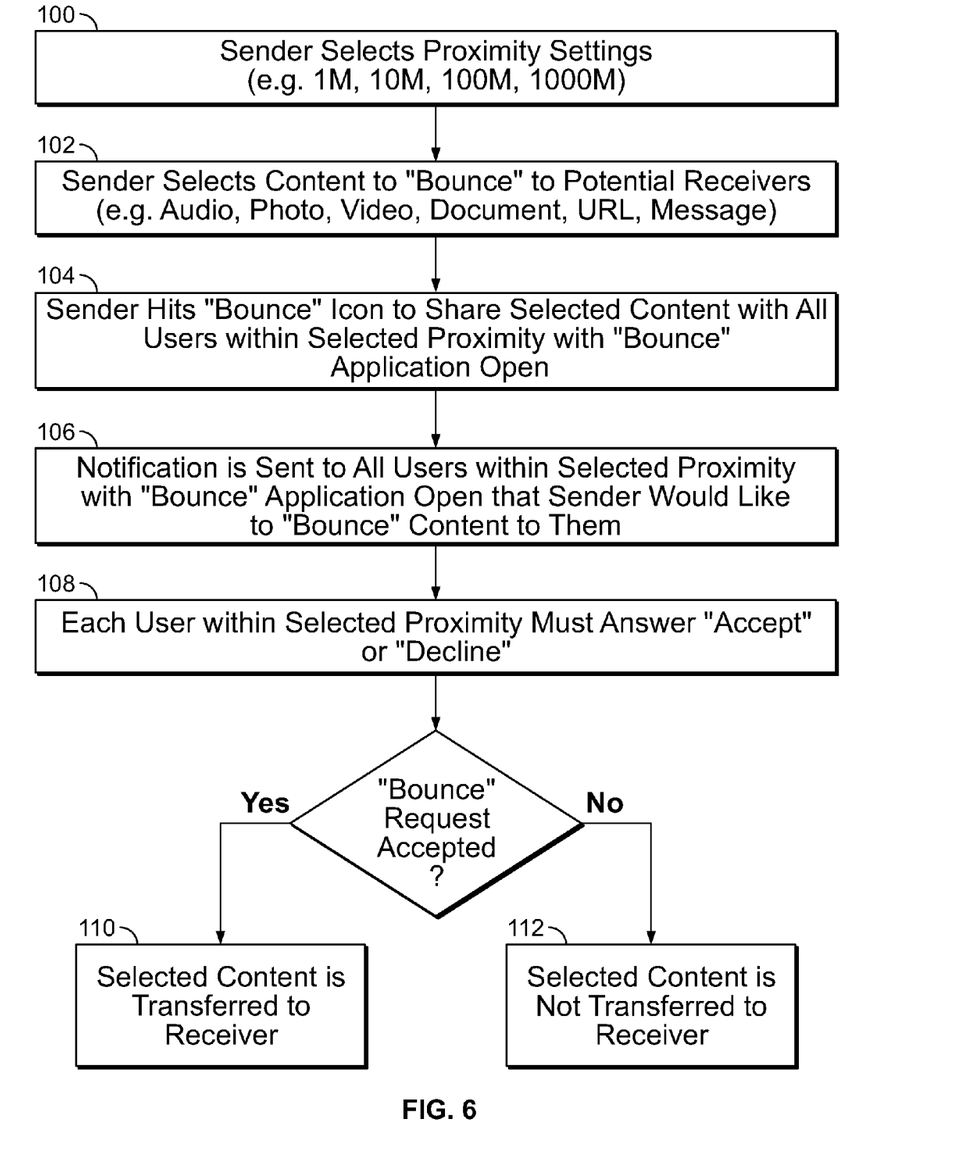
FIG. 6 is a flow chart illustrating the methodology of using the proximity-based content sharing application of the present invention.

FIG. 6 illustrates a flow chart illustrating the methodology of using the "bounce" functionality of the proximity-based content sharing application of the present invention. In the first step (100), the user must select a desired proximity range to delineate the geographic scope of the content sharing of the present invention. In the second step (102), the user selects content to be sent to potential receivers, namely, users having the "Bounce" application open who are physically located within the selected proximity relative to the sender. The sender then hits the "Bounce" icon 38 to initiate the transfer of that selected content (step 104). A notification request is then sent to all potential receivers, which informs them that a "Bounce" request has been initiated by the sender (step 106). Each potential receiver must then accept or decline the proposed transfer of content (step 108). If the potential receiver accepts, then the selected content will be transferred to their "Bounce" application (step 110) such that it can be consumed by the receiver, namely viewed in the case of photo and video files, listened to in the case of audio files, or read in the case of documents and any optional message 32. If the potential receiver declines, the proposed transfer will not occur to that particular user (step 112).

The application of the present invention is a simple yet elegant way of sharing content between users of smart phones, tablets, and computers based on the physical proximity between the sender and receiver of the content. The application accomplishes through the use of global positioning system (GPS) technology, which allows the sender to create a virtual perimeter within which all users with the application open will be able to receive the content being shared by the sender, if they choose to accept it. As described above, the present invention has a number of highly advantageous and compelling applications, including but not limited to music, filmmaking, business, and school teaching. It provides a unique and improved manner of sharing content amongst interested parties. The content is in electronic form and may take the form of music, video, photographs, documents, URLs, and messages.

Figure 7:
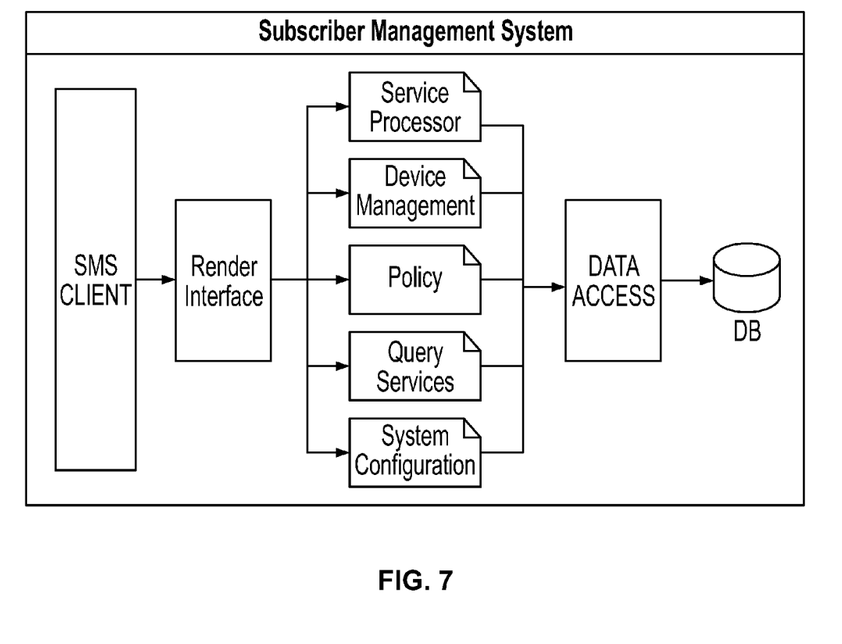
FIG. 7 is a diagram of an exemplary subscriber management system capable of establishing the desired electronic communication to effectuate the proximity-based content sharing application of the present invention.
Figure 8:
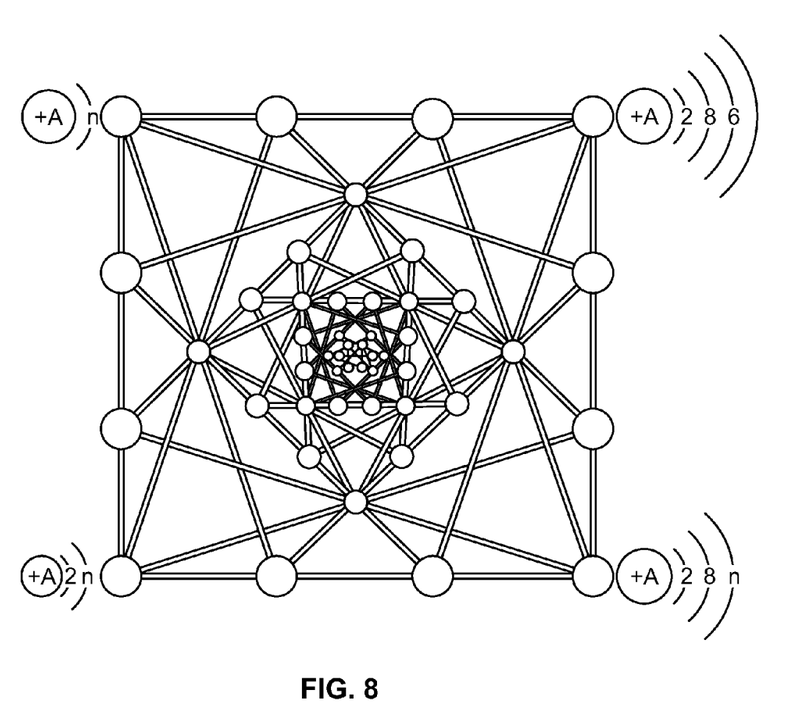
FIG. 8 is a diagram of an exemplary transmission OSPF (Open Shortest Path First) routing system capable of establishing the desired electronic communication to effectuate the proximity-based content sharing application of the present invention.
Figure 9:
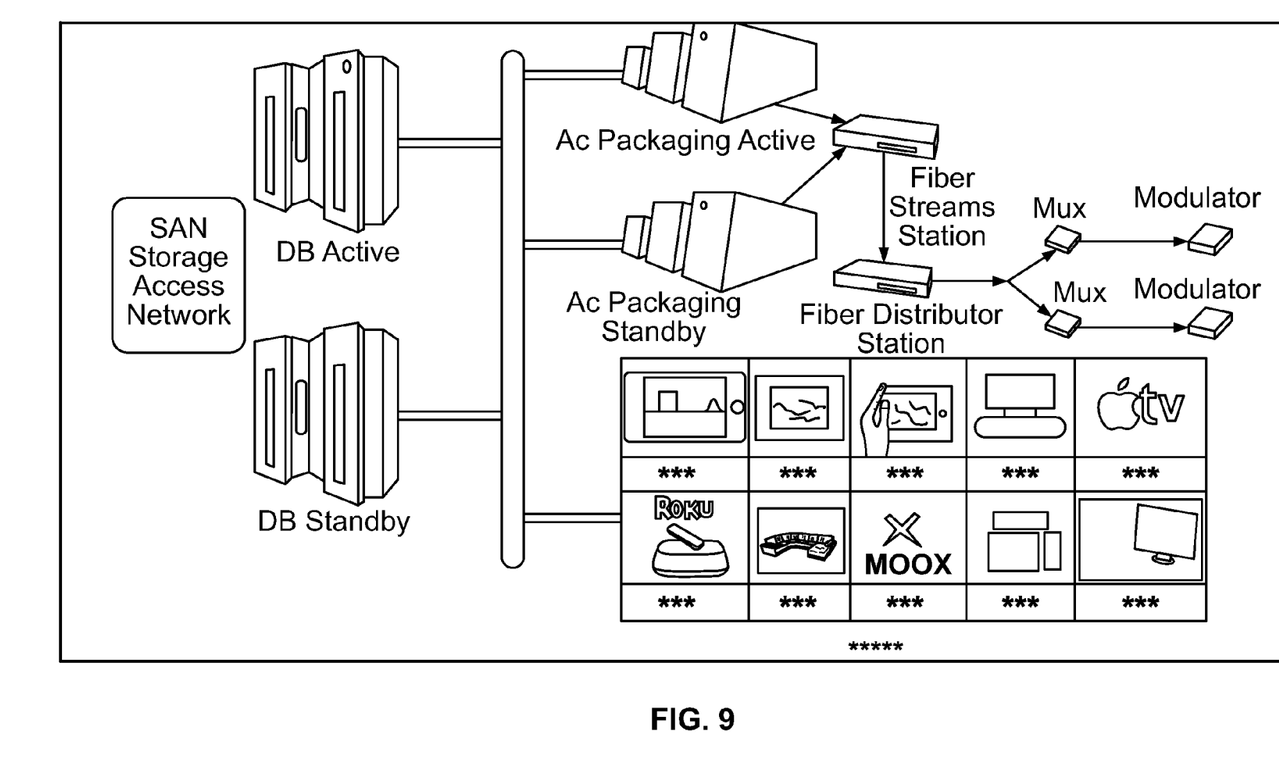
FIG. 9 is a diagram of an exemplary cloud storage technology storage area network (SAN) capable of establishing the desired electronic communication to effectuate the proximity-based content sharing application of the present invention.
Figure 10:
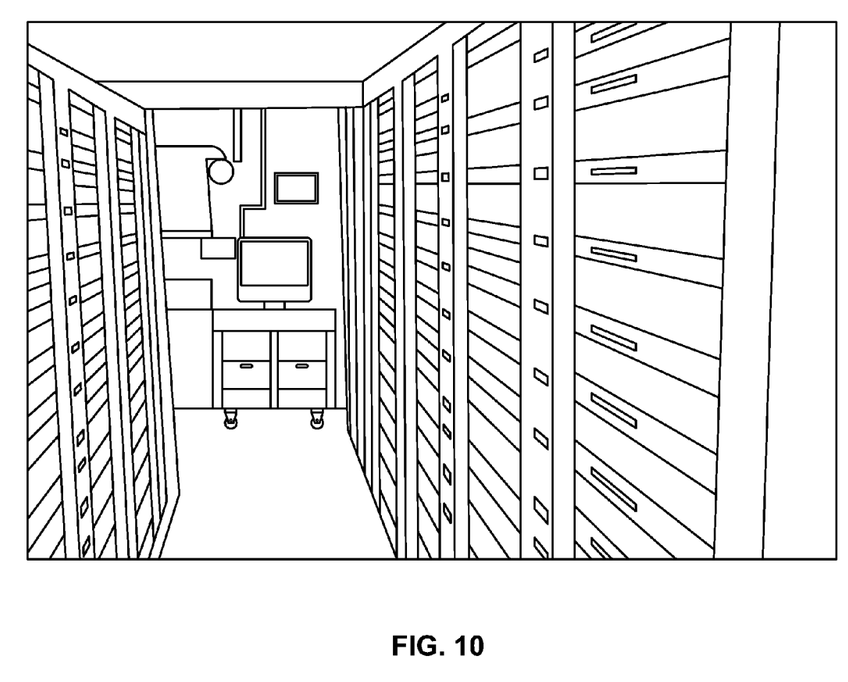
FIG. 10 is a diagram of an exemplary fiber server facility network capable of establishing the desired electronic communication to effectuate the proximity-based content sharing application of the present invention.

As noted above, the manner of electronic communication between the sender and receiver may be based on any number of communication technologies, techniques and/or protocols, including but not limited to those shown by way of example in FIGS. 7-10, which will be readily understood by those skilled in the art. FIG. 7 illustrates an exemplary subscriber management system capable of establishing the desired electronic communication to effectuate the proximity-based content sharing application of the present invention. FIG. 8 illustrates an exemplary transmission OSPF (Open Shortest Path First) routing system capable of establishing the desired electronic communication to effectuate the proximity-based content sharing application of the present invention. FIG. 9 illustrates an exemplary cloud storage technology storage area network (SAN) capable of establishing the desired electronic communication to effectuate the proximity-based content sharing application of the present invention. FIG. 10 illustrates an exemplary fiber server facility network capable of establishing the desired electronic communication to effectuate the proximity-based content sharing application of the present invention. It will be appreciated that the electronic communication between the sender and receiver may be based on any or all of these, as well as any developed in the future.

Any of the features or attributes of the above the above described embodiments and variations can be used in combination with any of the other features and attributes of the above described embodiments and variations as desired. Various modifications, additions and other alternative embodiments are possible without departing from the true scope and spirit. The embodiments presented herein were chosen and described to provide an illustration of various principles of the present invention and its practical application to thereby enable one of ordinary skill in the art to utilize the invention in various embodiments and with various modifications as are suited to the particular use contemplated. All such modifications and variations are within the scope of the present invention as determined by the appended claims when interpreted in accordance with the benefit to which they are fairly, legally, and equitably entitled.

What is claimed is:

1. An application for use on communication devices of a sender and a potential receiver and capable of enabling the transmission of digital content from said sender to said potential receiver, said application configured to perform the following steps:

allowing said sender to select within said application a predetermined proximity range from a group of at least four predetermined proximity ranges to thereby define a virtual perimeter relative to the physical location of said sender that establishes a maximum distance that digital content communications initiated by said sender using said application can be sent away from said physical location of said sender, wherein said group of at least four predetermined proximity ranges includes a lowest range of at least one meter;

allowing said sender to select using said application digital content to define selected digital content to be transferred to a potential receiver, wherein said potential receiver consists of every individual having a communication device running said application who is physically located within said virtual perimeter established by said sender by selecting within said application said predetermined proximity range from said group of at least four predetermined proximity ranges without regard to any other selection criteria; and transferring said selected digital content within said application to each potential receiver who agreed to accept digital content within said application, wherein said selected digital content is transferred to each said potential receiver within said application for consumption by each said potential receiver within said application.

2. The application of claim 1, wherein said selected digital content may be selected by said sender by manually selecting digital content from a list of digital content located on at least one of said communication device of said sender using said application and a web-based storage location accessible by said sender using said application.

3. The application of claim 1, comprising a voice recognition system on said communication device of said sender capable of enabling the selection of said selected digital content and said transfer of said selected digital content to said potential receiver based on verbal commands from said sender to said voice recognition system.

4. The application of claim 1, wherein said communication device of said sender and each said potential receiver is at least one of a smart phone, a tablet, and computer.

5. The application of claim 1, wherein said predetermined proximity range is at least one of selected from a list of at least four predefined proximity ranges and a custom proximity range defined manually by said sender, wherein said four predetermined proximity ranges includes a lowest range of at least one meter.

6. The application of claim 1, wherein said selected digital content is in electronic form and may take the form of at least one of music, video, photographs, documents, URLs, and alphanumeric messages.

7. A method of sharing content between a sender having a communications device and at least one potential receiver having a communications device who is disposed within a predetermined proximity of said sender, wherein each communications device has an application downloaded and operational to enable the steps comprising:

selecting using said application on said communications device of said sender a predetermined proximity range relative to the physical location of the sender, wherein said predetermined proximity range is selected by said sender from a group of at least four predetermined proximity ranges to thereby define a virtual perimeter relative to the physical location of said sender that establishes a maximum distance that digital content communications initiated by said sender using said application can be sent away from said physical location of said sender, wherein said group of at least four predetermined proximity ranges includes a lowest range of at least one meter;

selecting using said application on said communications device of said sender digital content to define selected digital content to be transferred to said potential receiver, wherein said potential receiver consists of every individual having a communication device running said application who is physically located within said virtual perimeter established by said sender by selecting within said application said predetermined proximity range from said group of at least four predetermined proximity ranges without regard to any other selection criteria; and transferring using said application said selected digital content to each said potential receiver who agreed to accept digital content using said application, wherein said selected digital content is transferred to each said potential receiver within said application for consumption by each said potential receiver within said application.

8. The method of claim 7, wherein said selected digital content may be selected by said sender by manually selecting digital content from a list of digital content located on at least one of said communication device of said sender using said application and a web-based storage location accessible by said sender using said application.

9. The method of claim 7, comprising a voice recognition system on said communication device of said sender capable of enabling the selection of said selected digital content and said transfer of said selected digital content to said potential receiver based on verbal commands from said sender to said voice recognition system.

10. The method of claim 7, wherein said communication device of said sender and said potential receiver is at least one of a smart phone, a tablet, and computer.

11. The method of claim 7, wherein said predetermined proximity range is at least one of selected from a list of at least four predefined proximity ranges and a custom proximity range defined manually by said sender.

12. The method of claim 7, wherein said selected digital content is in electronic form and may take the form of at least one of music, video, photographs, documents, URLs, and alphanumeric messages.

13. A communication device having an application downloaded for use in sharing digital content between a sender and a potential receiver, said application configured to:

(a) allow said sender to select within said application a predetermined proximity range relative to the physical location of said sender, wherein said predetermined proximity range is selected by said sender from a group of at least four predetermined proximity ranges to thereby define a virtual perimeter relative to the physical location of said sender that establishes a maximum distance that digital content communications initiated by said sender using said application can be sent away from said physical location of said sender, wherein said group of at least four predetermined proximity ranges includes a lowest range of at least one meter;

(b) allow said sender to select digital content using said application to be transferred to a potential receiver, wherein said potential receiver consists of every individual having a communication device running said application who is physically located within said virtual perimeter established by said sender by selecting within said application said predetermined proximity range from said group of at least four predetermined proximity ranges without regard to any other selection criteria; and (c) transfer said selected digital content from said application of said sender to said application of each said potential receiver who agreed to accept digital content using said application, wherein said selected digital content is transferred to each said potential receiver within said application for consumption by each said potential receiver within said application.

14. The communication device of claim 13, wherein said selected digital content may be selected by said sender by manually selecting digital content from a list of digital content located on at least one of said communication device of said sender using said application and a web-based storage location accessible by said sender using said application.

15. The communication device of claim 13, comprising a voice recognition system on said communication device of said sender capable of enabling the selection of said selected digital content and said transfer of said selected digital content to said potential receiver based on verbal commands from said sender to said voice recognition system.

16. The communication device of claim 13, wherein said predetermined proximity range is at least one of selected from a list of at least four predefined proximity ranges and a custom proximity range defined manually by said sender.

17. The communication device of claim 13, wherein said selected digital content is in electronic form and may take the form of at least one of music, video, photographs, documents, URLs, and alphanumeric messages.

18. The communication device of claim 13, wherein said communication device of said sender and said potential receiver is at least one of a smart phone, a tablet, and computer.

\* \* \* \* \*